United States Patent
Schmalzhofer

(10) Patent No.: US 7,073,943 B2
(45) Date of Patent: Jul. 11, 2006

(54) SLIDER SYSTEM FOR A PROFILED BAR

(75) Inventor: Rainer Schmalzhofer, Eppingen-Kleingartach (DE)

(73) Assignee: FMS Forder-und Montage-Systeme Schmalzhofer GmbH, Eppingen-Muhlbach (DE)

( * ) Notice: Subject to any disclaimer, the term of this patent is extended or adjusted under 35 U.S.C. 154(b) by 0 days.

(21) Appl. No.: 10/468,094

(22) PCT Filed: Feb. 15, 2002

(86) PCT No.: PCT/DE02/00545

§ 371 (c)(1),
(2), (4) Date: Aug. 13, 2003

(87) PCT Pub. No.: WO02/064309

PCT Pub. Date: Aug. 22, 2002

(65) Prior Publication Data

US 2004/0096129 A1     May 20, 2004

(30) Foreign Application Priority Data

Feb. 15, 2001    (DE) .......................... 201 02 661 U

(51) Int. Cl.
*F16C 29/02*     (2006.01)
(52) U.S. Cl. .......................................... 384/35; 384/42
(58) Field of Classification Search ................ 384/42, 384/26, 35, 912
See application file for complete search history.

(56) References Cited

U.S. PATENT DOCUMENTS

| 4,712,927 A | 12/1987 | Arrendiell et al. |
| 5,429,438 A | * 7/1995 | Wood .......................... 384/42 |

FOREIGN PATENT DOCUMENTS

| DE | 1 009 373 | 11/1957 |
| DE | 69 01 649 | 1/1969 |
| DE | 86 20 533.1 | 1/1987 |
| DE | 87 12 830.6 | 1/1988 |

(Continued)

OTHER PUBLICATIONS

MiniTec, Profilsystem Katalog 1993, MiniTec GmbH, Waldmohr; S. (p. 76-77).

(Continued)

*Primary Examiner*—Lenard A. Footland
(74) *Attorney, Agent, or Firm*—Darby & Darby

(57) ABSTRACT

A slider system for a profiled bar (10.1), especially a bar of extruded light metal, which, is provided in predefined cross-sectional system axes (A, B) with an undercut longitudinal groove (12) on a respective side or at least one outer side having a predefined width (B1). At least one slider profile section (20.1) is connected to the profiled bar and is able to be displaced in direction of said profiled bar. The invention is characterized in that at least one slider profile (20.1) having at least one undercut inner longitudinal groove (22) which is arranged on one of the cross-sectional system axes (A, B) when the slider profile (20.1) is connected to the profiled bar, and by at least one sliding guide profile (14) which engages with the longitudinal groove (12) of the profiled bar (10.1) and the corresponding opposite inner longitudinal groove (12) of the slider profile (20.1) from the rear.

13 Claims, 13 Drawing Sheets

FOREIGN PATENT DOCUMENTS

| | | |
|---|---|---|
| DE | 36 29 368 A1 | 3/1988 |
| DE | 37 34 922 A1 | 4/1989 |
| DE | 38 30 607 A1 | 3/1990 |
| DE | 92 12 754.1 | 1/1993 |
| DE | 42 22 029 A1 | 1/1994 |
| DE | 43 14 658 A1 | 11/1994 |
| DE | 43 17 049 C2 | 11/1994 |
| DE | 196 31 260 A1 | 2/1998 |
| DE | 298 18 832 | 2/1999 |
| DE | 198 15 474 A1 | 10/1999 |
| DE | 200 04 802 | 7/2000 |
| EP | 0 136 431 A2 | 4/1985 |
| EP | 0 258 714 B1 | 3/1988 |
| EP | 0 482 268 A1 | 4/1992 |

OTHER PUBLICATIONS

Silverline, Paletti Profilsysteme, eingegangen Jul. 2, 1997; die Profile 2 Blatt.

* cited by examiner a)

b)

c)

SLIDER SYSTEM FOR A PROFILED BAR

This is a U.S. national phase application under 35 U.S.C. §371 of International Patent Application No. PCT/DE02/00545 filed Feb. 15, 2002 and which claims priority to German Patent Application No. 201 02 661.9 filed Apr. 25, 2002. The International Application was published in German on August 22, 2002 as WO 02/064309 A1 under Article 21(2).

TECHNICAL FIELD

The present invention relates to a slide system for a profiled bar, in particular an extruded lightweight metal bar, which, in predefined system cross-sectional axes, has in its respective or at least one outer side an undercut longitudinal groove with a predefined groove width, having at least one slide profile which is connected to the profiled bar such that it can be displaced in the profiled bar longitudinal direction.

Profiled bars of this type are frequently a substantial constituent part of aluminum profiled systems for machine construction. In this case, linear and guide systems are increasingly integrated and incorporated.

PRIOR ART

EP-0 258 714 B1 discloses a guide system for aluminum profiles in which a hardened guide shaft is clamped onto the profiles. A linear guide unit is formed by a roller-mounted slide. This system is technically very complex and therefore expensive and, in addition, in terms of the guide accuracy, is substantially dependent on the accuracy or linearity of the profiles themselves.

U.S. Pat. No. 5,429,438 discloses a guide system having plastic guide and sliding elements, in which the slides are constructed without a groove system and without chambers for the guide elements. This requires a great deal of effort for machining the slides and the guide elements. Furthermore, the possibility of combining this system is restricted.

SUMMARY OF THE INVENTION

On the basis of the aforementioned prior art, the present invention is based on the object and the technical problem of specifying a simple and cost-effective guide or slide system which matches existing profile systems, avoids the disadvantages of the existing systems and provides a high level of variability in application and a flexible possibility of combination for users. Furthermore, in the case of assembled slides, there are to be system dimensions for the grooves which correspond with the system dimensions of the basic system. Furthermore, combinations with profile systems with different system dimensions are to be possible.

The slide system according to the invention is given by the features of the independent claim 1.

Advantageous refinements and developments are the subject matter of the dependent claims.

Accordingly, the slide system according to the invention is distinguished by the fact that there is at least one slide profile which has at least one undercut internal longitudinal groove which, when the slide profile is connected to the profiled bar, is arranged in one of the system cross-sectional axes, and there is at least one sliding guide profile which engages behind a longitudinal groove in the profiled bar and the corresponding opposite internal longitudinal groove of the slide profile.

A particularly preferred development is distinguished by the fact that the slide profile has at least one undercut external longitudinal groove on the outer side lying opposite the internal longitudinal groove.

In order to arrive at the most compact profile cross section, a preferred refinement is distinguished by the fact that the contour, that is to say the width and also the height, of the internal longitudinal groove of the slide profile is smaller than the contour, that is to say the width and the height, of the longitudinal groove of the profiled bar.

In order to provide system-conforming connection possibilities on the slide profile as well, a preferred development is distinguished by the fact that the contour, that is to say the width and the height, of the external longitudinal groove of the slide profile corresponds to the contour, that is to say the width and the height, of the longitudinal groove of the profiled bar.

A particularly preferred development is distinguished by the fact that the slide profile is formed as a U profile having at least one internal groove on the web and at least one internal groove in each case on the flanges of the slide profile.

An alternative refinement with compact individual slide profiles is distinguished by the fact that the slide profile is formed as an L profile with at least one internal longitudinal groove per leg. There is preferably at least one external longitudinal groove on each leg of the L-shaped slide profile.

In order to ensure high variability, a particularly advantageous refinement is distinguished by the fact that the grid dimension of adjacent internal longitudinal grooves corresponds to the grid dimension of adjacent external longitudinal grooves.

A particularly advantageous development is distinguished by the fact that at least one further slide profile is arranged such that it can be displaced longitudinally on the upper side and/or underside of the slide profile. This makes it possible to provide profile systems which can be telescoped and whose telescoping length can be varied as desired.

In order to arrive at sliding guide profiles which can be used economically, it is particularly advantageous to form these in the upper and lower cross-sectional area as a grooved block profile, the sliding guide profiles preferably being formed of plastic. The grooved block profile is in this case formed in such a way that it engages behind the corresponding groove on the profiled bar or slide.

A particularly preferred refinement is distinguished by the fact that, in the web region of the sliding guide profile, between the upper and lower cross-sectional areas, in each case a protruding profile pointing to the left and right is integrally molded on, its thickness being different depending on the underlying basic system.

A design variant which implements the variability with regard to the construction is distinguished by the fact that the profiled bar is formed as a rectangular or square profile and an L-shaped slide profile is arranged such that it can be displaced longitudinally at the upper right and/or upper left and/or lower right and/or lower left corner region of the profiled bar. Alternatively, the slide profile can be formed as a U-shaped profile which is arranged such that it can be displaced longitudinally on the upper side and/or lower side of the profiled bar. In this case, a plurality of U profiles arranged one above another can be used.

Furthermore, it is possible to use between the slide profiles coupling profiles which couples the displacement movements of the respective slide profiles to one another.

An alternative refinement is distinguished by the fact that the slide profile is formed as a narrow rectangular profile.

A particularly economic implementation is characterized in that the slide profile is formed as an extruded lightweight metal profile.

The slide profiles according to the invention have on the outer side system-conforming external grooves which are arranged at the system spacings of existing profiled bar systems or in an integer ratio in order to accommodate fixing elements. As a result of forming the external longitudinal groove as a system groove, the standard connectors and standard elements present in the profile system can be used, which further increases the economy of the system.

On the inner side of the slide profiles; in each case on the mid-axes of the grooves, there are internal longitudinal grooves corresponding to the standard profiles, in which special sliding guide profiles are anchored.

The dimensional graduation of the slide profiles is carried out in such a way that the slide profile external contour also corresponds to the standard profile dimensions, so the slide profiles can be arranged one above another in the manner of a telescope and can be fitted to one another such that they can be displaced longitudinally by using identical sliding guide elements. Arranging the guide slides on the standard profiles as single or double slides, in conjunction with the slide profiles that can be used in the manner of a telescope, results in a large number of arrangement and combination possibilities.

In a preferred exemplary embodiment, the internal contour of the slide profiles is, for example, selected such that one combination possibility can be implemented with the respectively matching standard profile of 40 (millimeters) system dimension. The selected contour is, however, also possible for combination and use possibilities for system profiles with other system dimensions, for example 45 and 50 (millimeters). Thus, profiles with the system dimensions 40×40 or 45×45 can be connected, for example, to a U-shaped slide profile with a width B=80 mm. The L-shaped slide profiles can, for example, be combined without difficulty with 40×40, 45×45 or 50×50 profiles.

One design variant which implements the advantageous ability to be combined is distinguished by the fact that a combination of L-shaped and/or U-shaped and/or rectangular slide profiles is arranged on the profiled bar.

The sliding guide profile is composed of a special sliding plastic having a high strength and a low coefficient of friction, so that high loads can be transmitted with a low frictional force.

The slide system according to the invention can be produced economically, guarantees a simple, permanently functional solution for linear tasks on profile systems, exhibits high flexibility with regard to its ability to be used on profiled bars and can in particular even be retrofitted without difficulty in existing profile systems, since the grid dimensions selected are designed to be compatible with the grid dimensions of existing profile bars.

Further embodiments and advantages of the invention emerge from the features further listed in the claims and from the exemplary embodiments indicated below.

The features of the claims can be combined with one another in any desired manner to the extent that they do not obviously exclude one another.

BRIEF DESCRIPTION OF THE DRAWING

The invention and advantageous embodiments and developments of the same will be described in more detail and explained below by using the examples illustrated in the drawing. The features to be taken from the description and the drawing can be applied individually on their own or in a plurality in any desired combination according to the invention. In the drawing.

PREFERRED EMBODIMENTS OF THE INVENTION

Figure 1:
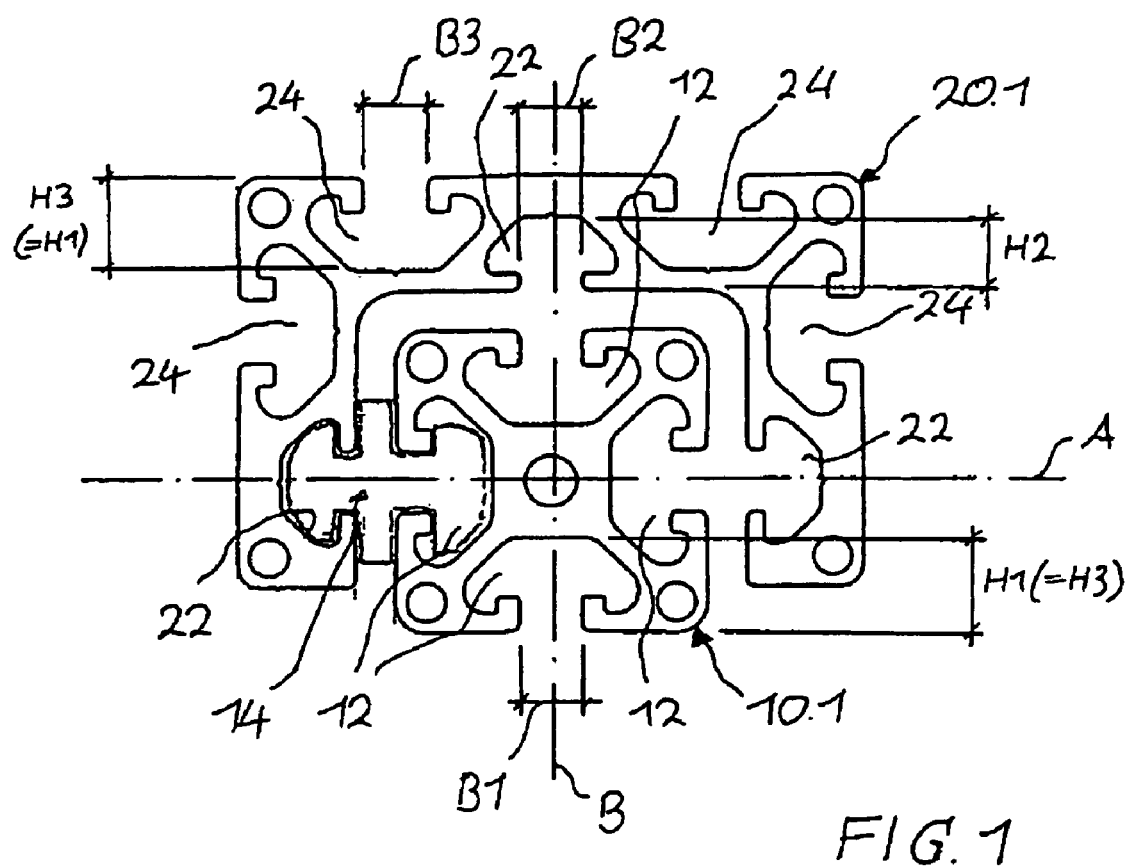
FIG. 1 shows a schematic cross-section through a square profiled bar with a U-shaped slide profile.

FIG. 1 illustrates a profiled bar 10.1 which is formed as a square standard lightweight metal profile. In the system axes A, B, which are at the same time axes of symmetry, an undercut longitudinal groove 12 is molded in on each outer side.

On the upper side of the profiled bar 10, a U-shaped slide profile 20.1 is arranged such that it can be displaced longitudinally, surrounding the upper side and the two side walls of the profiled bar 10.1. Both the profiled bar 10.1 and the slide profile 20.1 are formed as extruded aluminum profiles.

The slide profile 20.1 has, corresponding to the longitudinal grooves 12 of the profiled bar 10.1, in the system axes A and B, on the inner side, in each case an undercut internal longitudinal groove 22 located opposite the respective longitudinal groove 12. Arranged in each internal longitudinal groove 22 with a corresponding longitudinal groove 12 of the profiled bar 10.1 is a sliding guide profile 14 (dashed illustration in FIG. 1) which, in FIG. 7, which represents a detail perspective illustration of the arrangement according to FIG. 1, is present in inserted form. Offset with respect to the internal longitudinal groove 22, on the outer side of the slide profile 20.1, undercut external longitudinal grooves 24 are molded in. In this case, an external longitudinal groove 24 is in each case molded in in the legs of the U-shaped slide profile 20.1, and two external longitudinal grooves 24 are in each case molded in in the web of the U-shaped slide profile 20.1.

The longitudinal grooves 12 of the profiled bar 10.1 have a width B1 and a height H1 (FIG. 1). The width B3 and the height H3 of the external longitudinal groove 24 of the slide profile 20.1 correspond to the width B1 and, respectively, the height Hi of the longitudinal grooves 12, so that, for the user, there are standard connecting elements on the profiled bar 10.1 and on the slide profile 20.1 for the connection of further components, even when the slide profile 20.1 is put in place. The width B2 and the height H2 of the internal longitudinal groove 22 is selected to be slightly smaller than the width B1 of the longitudinal grooves 12, in order that the standard grid dimensions with regard to the connection possibilities can also be implemented on the slide profile 20.1, as in the known profile systems. It is also possible to form the internal groove with its contour corresponding to the groove 12 of the profiled bar 10.1. In the exemplary embodiment illustrated, the groove widths B1 and B3 have been selected such that profiles from the profile series with the system dimension 40×40 (millimeters) can be used. The width B2 of the internal grooves is suitable for the use of profiles from the profile series 30×30 (millimeters).

Figure 7:
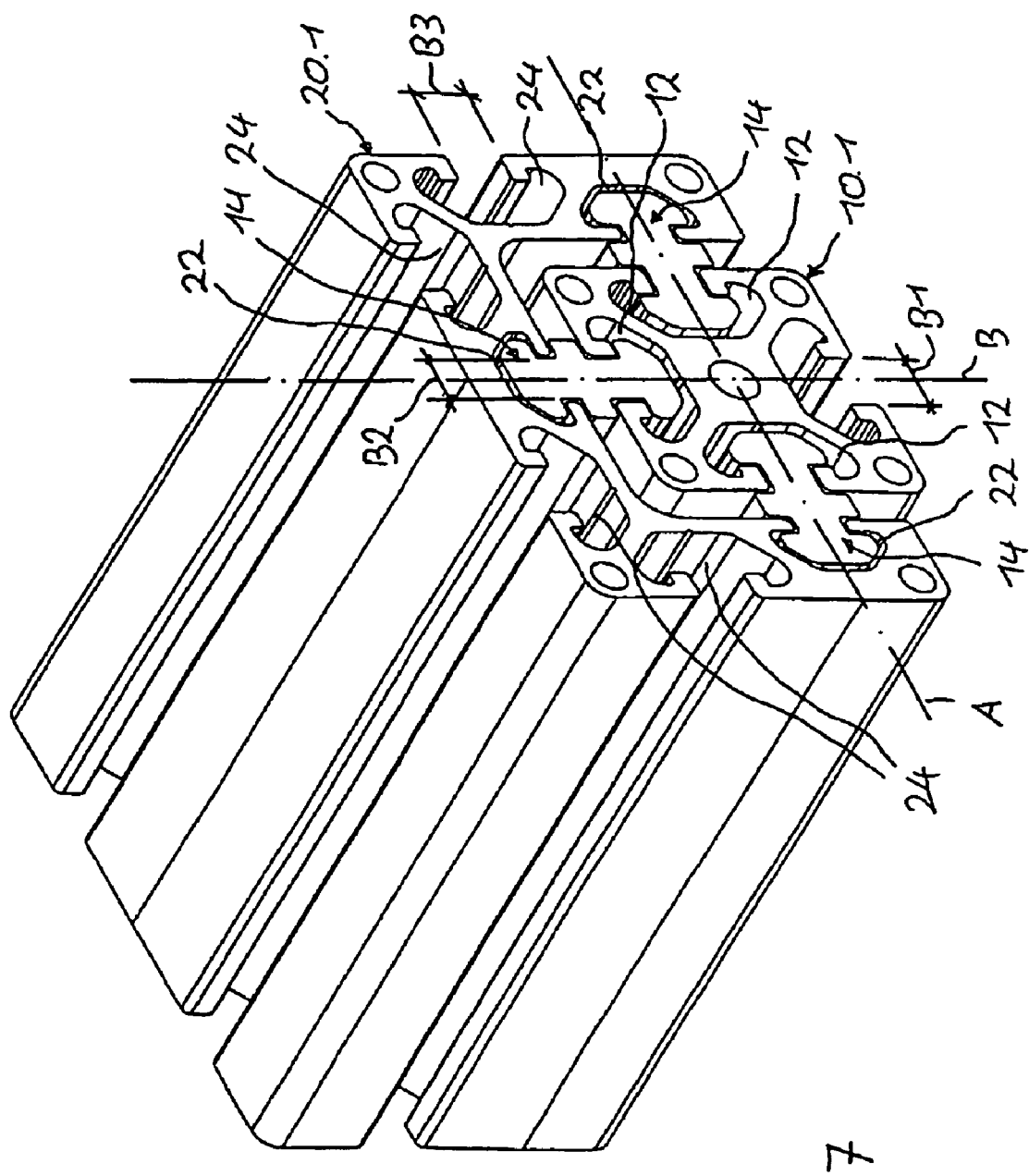
FIG. 7 shows a schematic detail perspective of the profiled bar with U-shaped slide profile according to FIG. 1 with slide guide profiles illustrated.
Figure 12:
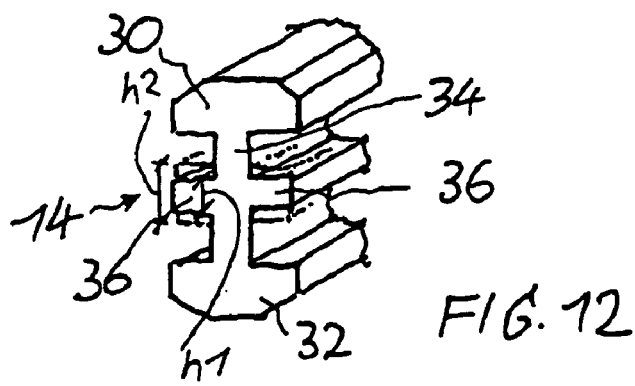
FIG. 12 shows a schematic detail perspective illustration of the sliding guide profile according to FIG. 8, FIGS. 13a to 13m show a schematic sectional illustration of the connection of different slide profiles to different system profiled bars, the system profiled bars having a grid dimension of 40 mm (millimeters) or a multiple thereof.

As can be seen from FIG. 7, the sliding guide profile 14 is in each case introduced into the opposite longitudinal groves 12 and, respectively, internal longitudinal groves 22, and, in its upper and lower cross-sectional area, in each case has a grooved block contour 30, 32 (see also FIG. 12). The sliding guide profile 14 is composed of a plastic with a low coefficient of sliding friction. Between the grooved block profiles 30, 32, on both sides of the web 34 of the sliding guide profile 14, a rectangular protruding profile 36 is integrally molded on. The protruding profile 36 has a rectangular cross section. The thickness h1, h2 of the protruding profile 36 can in this case be different. As a result, it is possible to use one and the same slide profile in basic system bars which have different basic system dimensions, for example 40 mm (millimeters) and 45 mm (millimeters). The sliding guide profile/profiles 14 is/are detachably fixed in a manner not specifically illustrated to the profiled bar 10, . . . or to the slide profile 20, . . .

Figure 15:
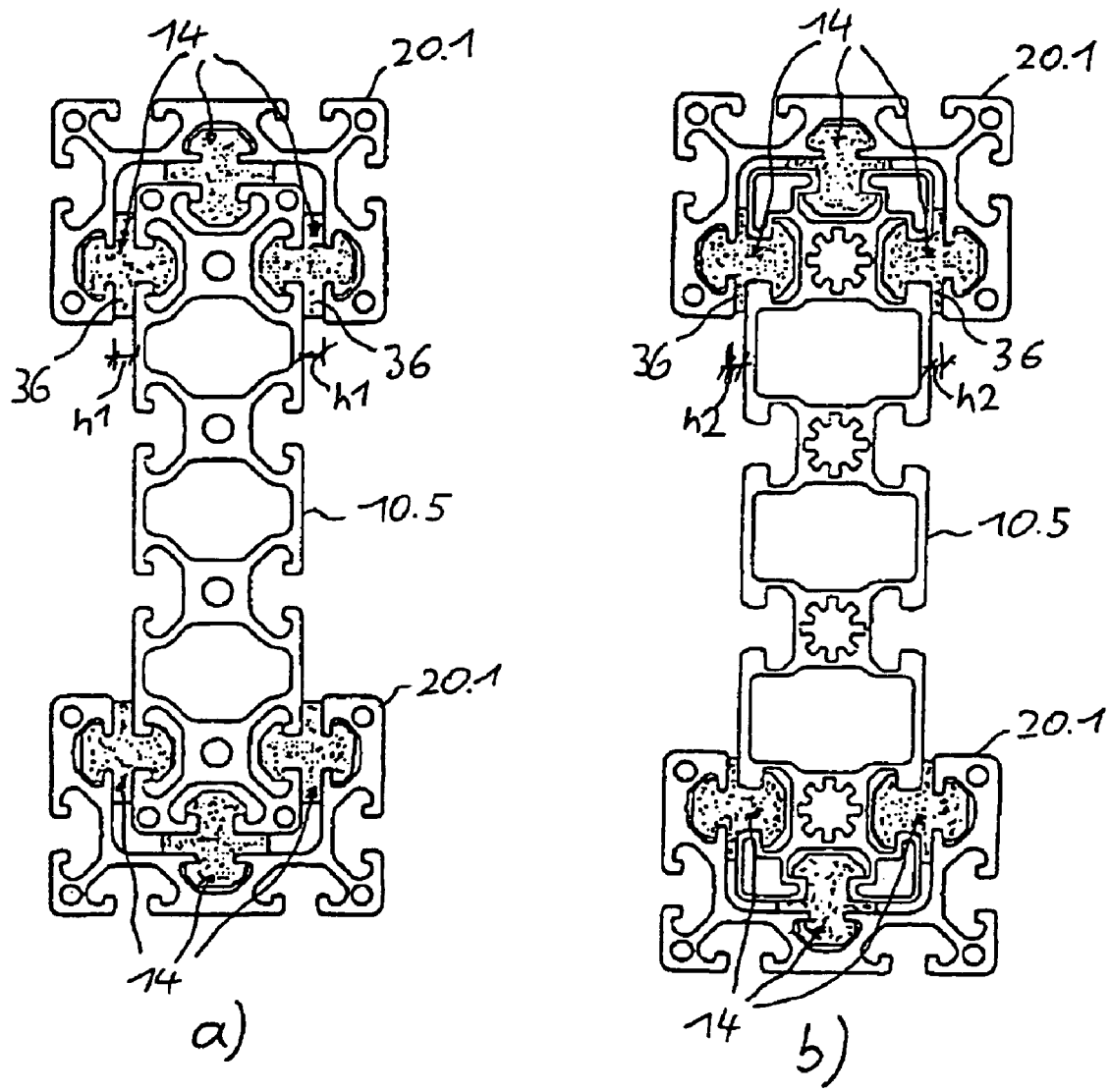
FIGS. 15a, 15b show an enlarged illustration of FIGS. 13g and 14f in a comparison of the different system dimensions.

This will be described further below using FIGS. 15a and b.

Figure 2:
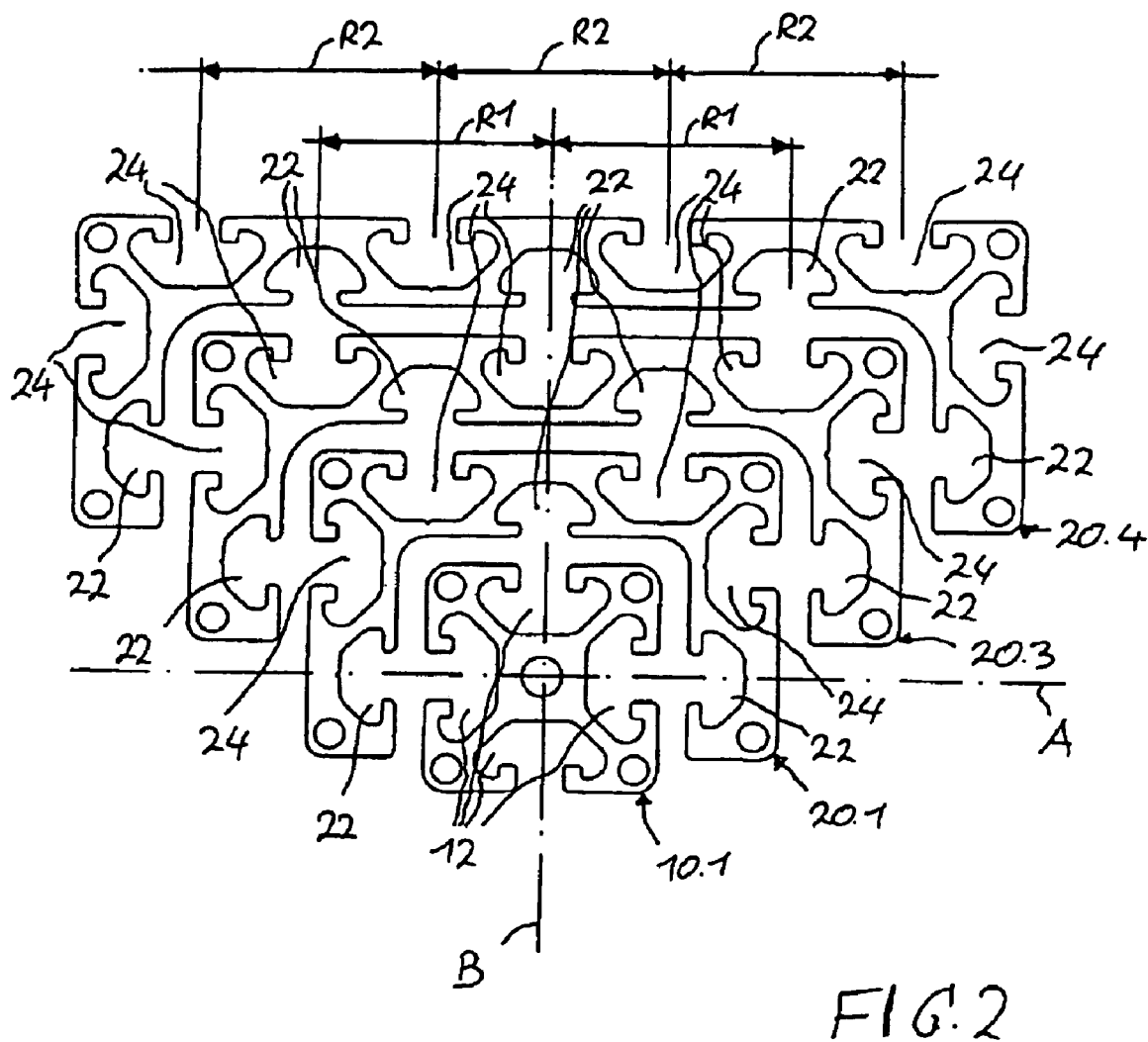
FIG. 2 shows a schematic cross section through a square profiled bar with a plurality of U-shaped slide profiles arranged on one another.

FIG. 2 illustrates, in cross section and schematically, the profiled bar 10.1 with the slide profile 20.1 according to FIG. 1, but supplemented around the upper side by two further slide profiles 20.3 and 20.4. The slide profiles 20.3, 20.4 likewise have internal longitudinal grooves 22 and external longitudinal grooves 24. The internal longitudinal grooves 22 are arranged at a grid dimension R1. The external longitudinal grooves 24 are arranged at a grid dimension R2. The grid dimensions R1 and R2 are in this case selected such that an outer longitudinal groove 24, for example of the slide profile 20.3, lies opposite the corresponding internal longitudinal groove 22 when the slide profile 20.4 is put in place. Sliding guide profiles which connect the slide profile 20.1 to the profiled bar 10.1, the slide profile 20.3 to the slide profile 20.1 and the slide profile 20.4 to the slide profile 20.3 are not illustrated in FIG. 2. The grid dimensions R1 and R2 are selected to be equally large in the exemplary embodiment illustrated. Overall, the grid dimension R2 is dimensioned such that it matches the system dimensions of known profiled bar systems.

The embodiment illustrated in FIG. 2 permits without difficulty the implementation of guide or linear systems which can be telescoped.

Figure 3:
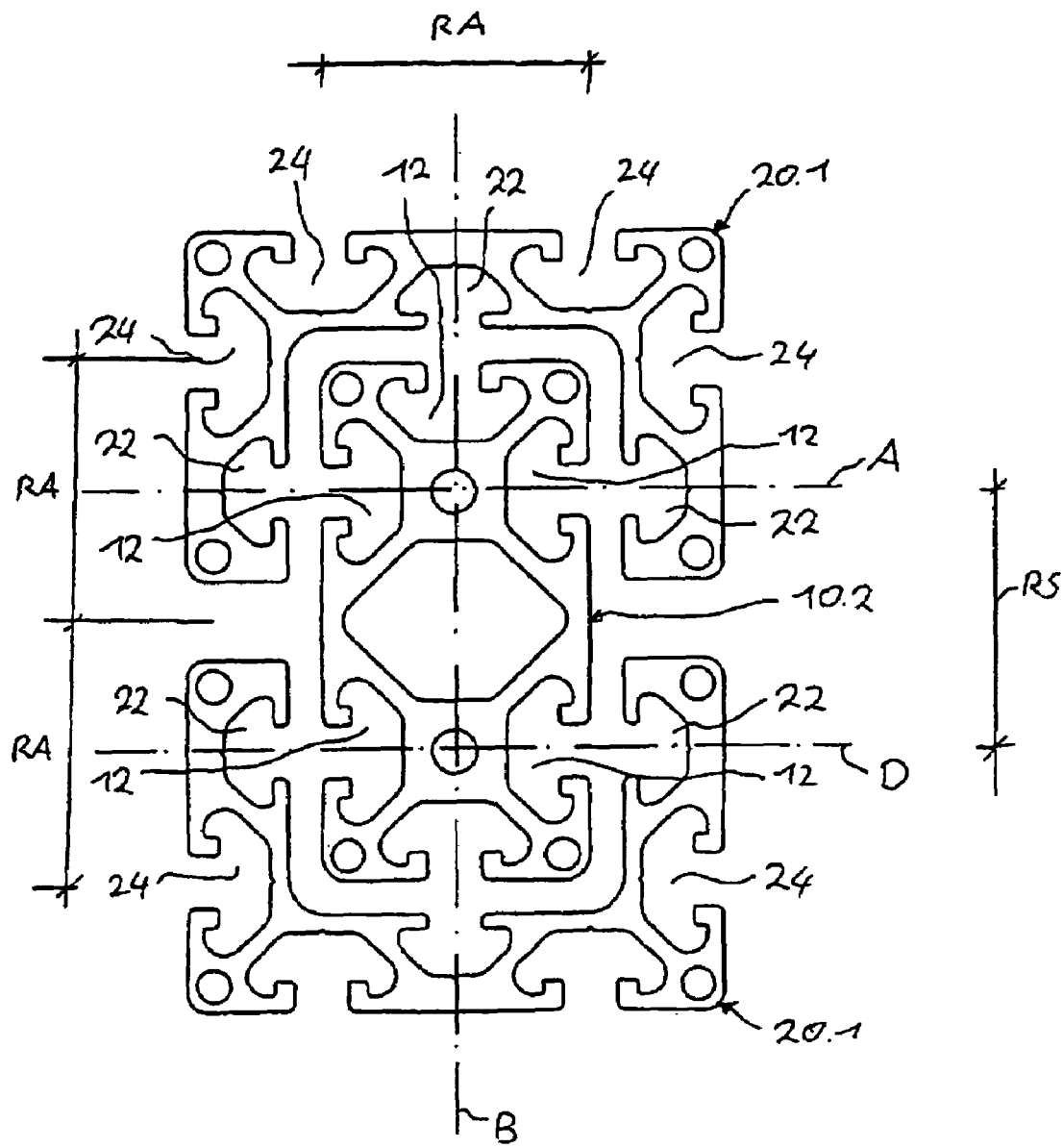
FIG. 3 shows a schematic cross section through a rectangular profiled bar with a U-shaped slide profile arranged on the top side and on the bottom side.

FIG. 3 shows, schematically in cross section, a rectangular profiled bar 10.2 which is arranged on edge and which, on its two outer sides, in each case has two undercut longitudinal grooves 12. The longitudinal grooves are spaced apart in parallel at the grid dimension RS. The vertical system axis is designated B and the horizontal system axes are designated A, D. On the profiled bar 10.2, in the upper region and in the lower region, in each case the slide unit 20.1, which has already been described using FIG. 1, is arranged such that it can be displaced longitudinally. The necessary sliding guide profiles are not specifically illustrated in FIG. 3. The upper and external grooves 24 of the slide unit 20.1 are spaced apart in parallel at a grid dimension RA which corresponds to the grid dimension RS of the profiled bar 10.2. The lateral external grooves of the upper and lower slide unit 20.1 have the grid dimension 2×RA. As a result, even when the slide units 20.1 are connected, the basic grid dimension RS of the profile system is maintained. Complete compatibility with the dimensions of the basic profile system is ensured.

Figure 4:
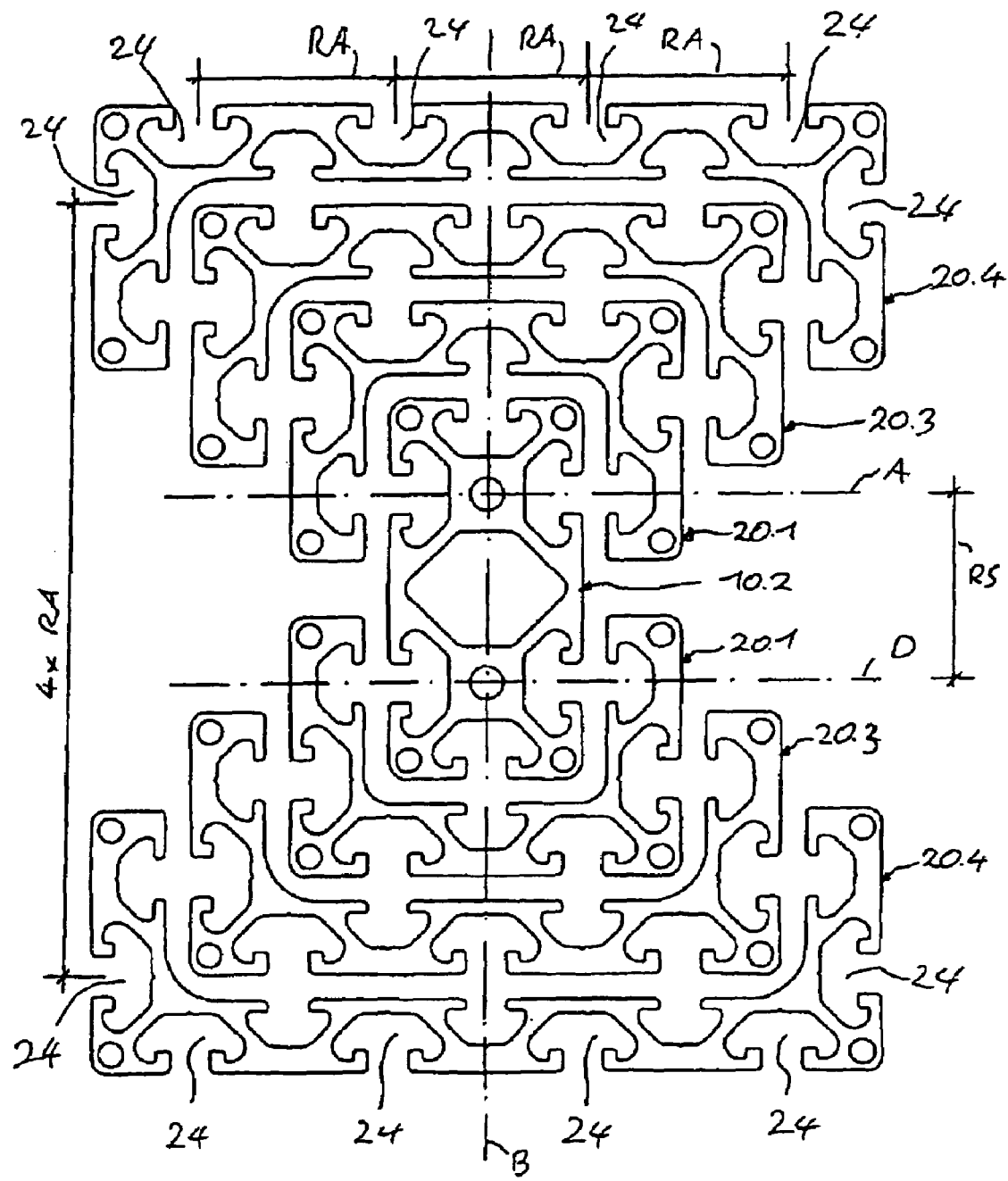
FIG. 4 shows a schematic cross section through a rectangular profiled bar with a plurality of U-shaped slide profiles arranged one above another in each case on the top side and the bottom side.

FIG. 4 shows the profiled bar 10.2 according to FIG. 3, in each case a total of three slide profiles 20.1, 20.3, 20.4 arranged one above another and one below another being arranged on the upper side and the underside. In this embodiment, too, the grid dimensions RA of the external grooves of the outer slide unit 20.4 are equal to the system grid dimension RS of the basic profiled bar or are a multiple thereof.

Figure 5:
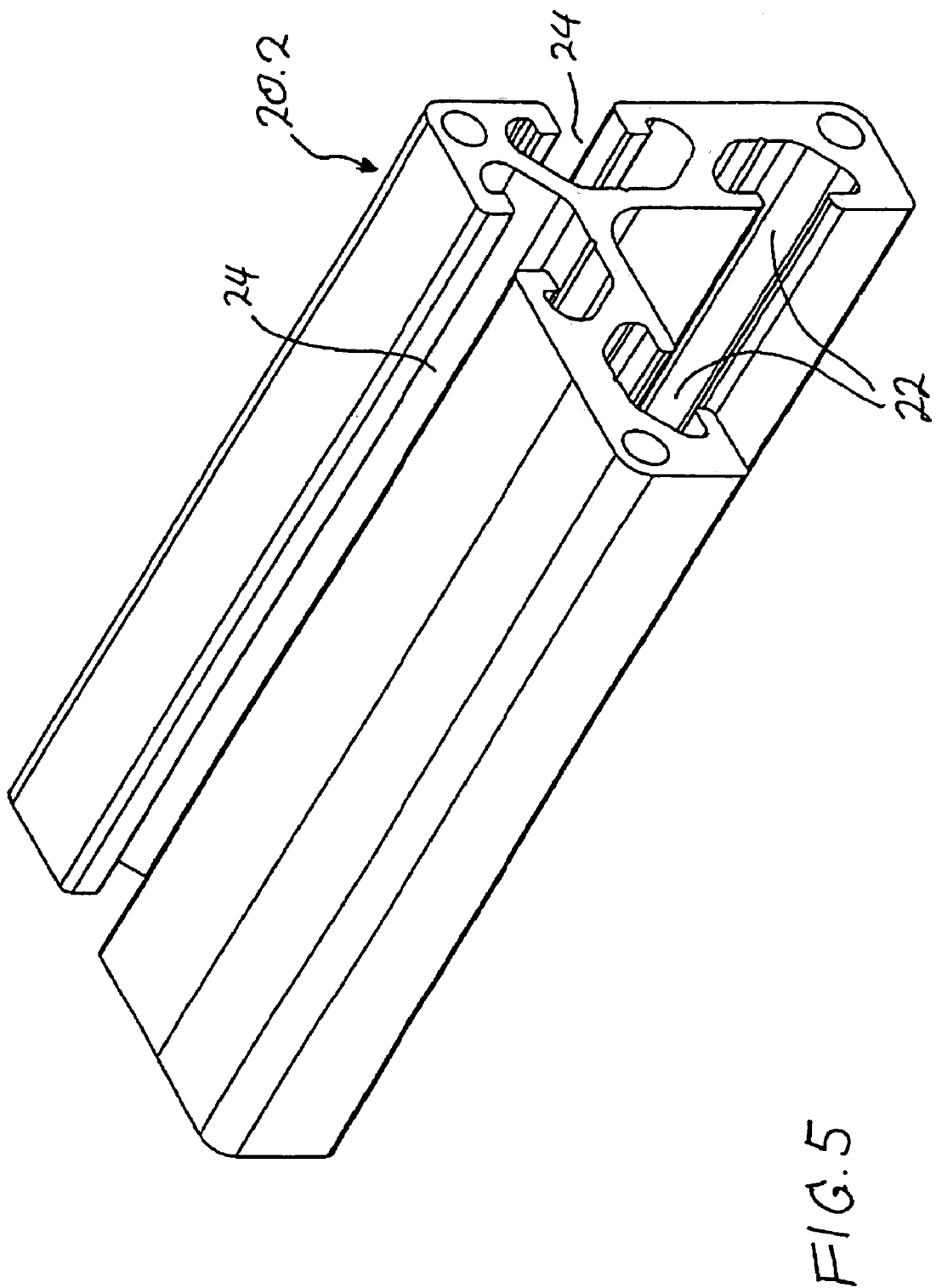
FIG. 5 shows a schematic detail perspective of an L-shaped slide profile.

In FIG. 5, a further embodiment of a slide profile 20.2 is illustrated in a detail perspective. The slide profile 20.2 is formed as an L profile. In each end region of the leg of the L profile there is an internal longitudinal groove 22 on the inner side. Offset with respect to the internal longitudinal groove 22 in the direction of the common corner point of the L-shaped slide profile 22, in each case an undercut external longitudinal groove 24 is molded in on the outer side.

Figure 6:
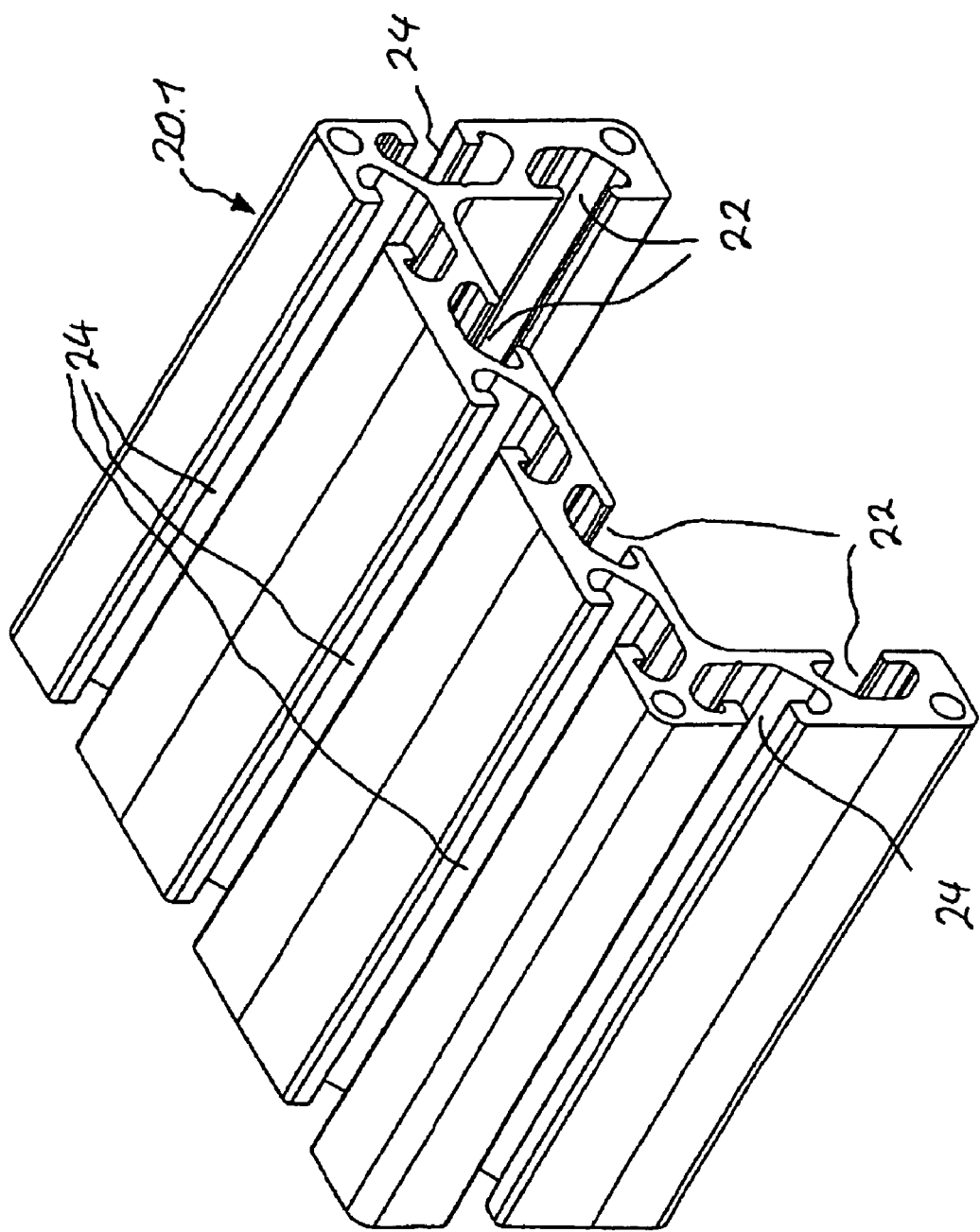
FIG. 6 shows a schematic detail perspective of a U-shaped slide element.

The U-shaped slide profile 20.1 is illustrated in a detail perspective in FIG. 6.

Figure 8:
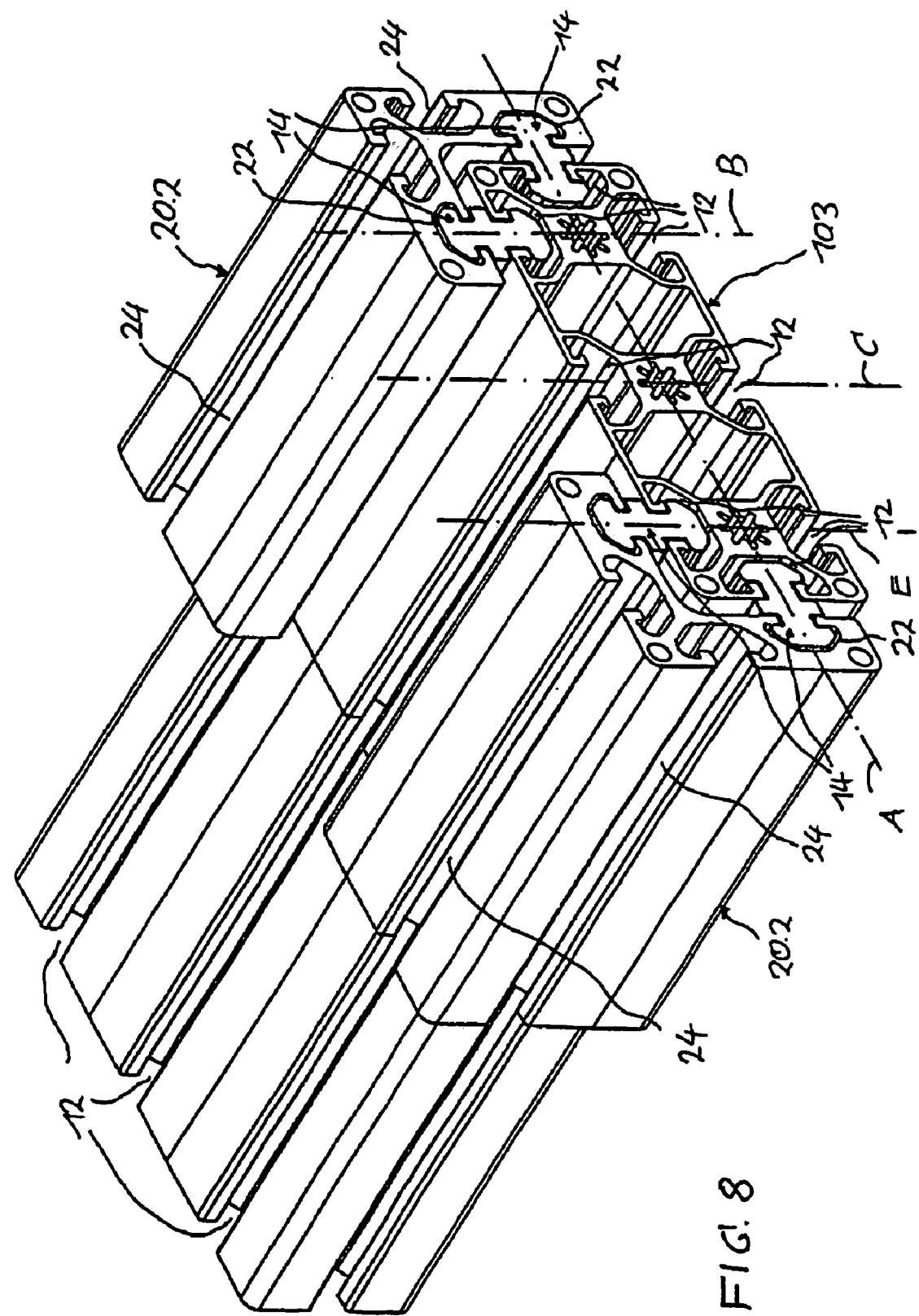
FIG. 8 shows a schematic detail perspective of a rectangular profiled bar with an L-shaped slide profile connected via a sliding guide profile such that it can be displaced longitudinally in each case in the upper right and left corner region.

FIG. 8 illustrates in a perspective view two L-shaped slide profiles 20.2 according to FIG. 5 on a profiled bar 10.3 arranged flat and having the horizontal system axis A and three vertical system axes B, C, E. The L-shaped slide profiles 20.2 are arranged such that they can be displaced longitudinalally in the left upper and right upper corner region in FIG. 8. The internal longitudinal grooves 22 are located in the left-hand slide profile 20.2 in the system axes A and E and in the right-hand slide profile 20.2 in the system axes A and B. The L-shaped slide profiles 20.2 are coupled via the sliding guide profiles 14, as already described.

Highly schematic different possible arrangements or possible combinations of slide profiles 20.1, 20.2, 20.3, 20.4, 20.5 are illustrated in FIGS. 9a to 9d, 10a to 10c and 11. The existing external and internal longitudinal grooves and sliding guide profiles are not specifically illustrated for reasons of clarity.

Figure 9:
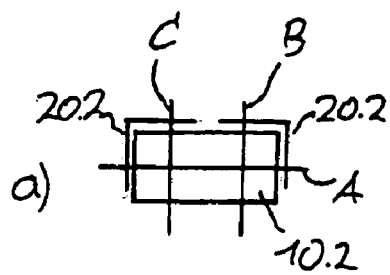
FIGS. 9a to 9d show a highly schematic illustration of an extremely wide range of arrangements of L-shaped slide profiles on profiled bars.
Figure 9:
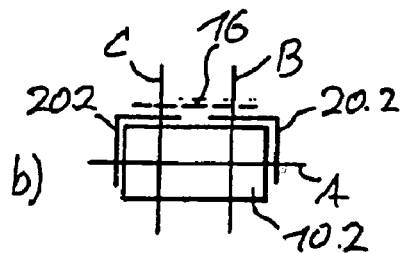
Figure 9:
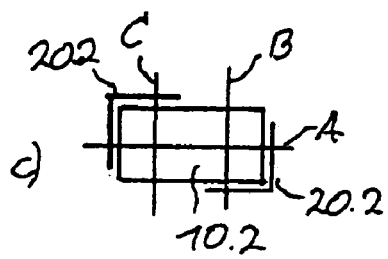
Figure 9:
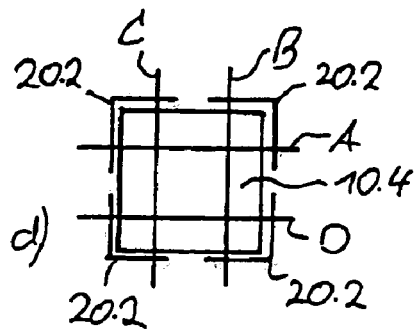

FIG. 9a illustrates the arrangement of an L-shaped slide profile 20.2 on both sides of the upper side of a profiled bar 10 which has the horizontal system axis A and two vertical system axes B and C.

FIG. 9b corresponds to the arrangement of FIG. 9a, a coupling profile 16, which is illustrated dashed, being additionally connected to the slide profiles 20.2 on their upper side, in order to couple their displacement movement.

FIG. 9c shows the arrangement of two diametrically opposite L-shaped slide profiles 20.2 on the profiled bar 10.

FIG. 9d shows the arrangement of a total of 4 L-shaped slide profiles 20.2 on a square profiled bar 10.4 having the horizontal system axes A and D and the vertical system axes B and C. A slide profile 20.2 is arranged in each corner region of the profiled bar 10.4.

Figure 10:
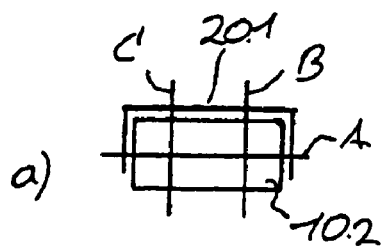
FIGS. 10a to 10c show a highly schematic illustration of an extremely wide range of possible arrangements of U-shaped slide profiles on profiled bars.
Figure 10:
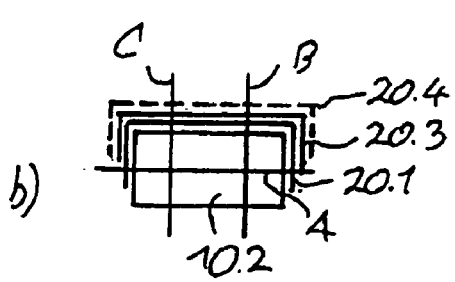
Figure 10:
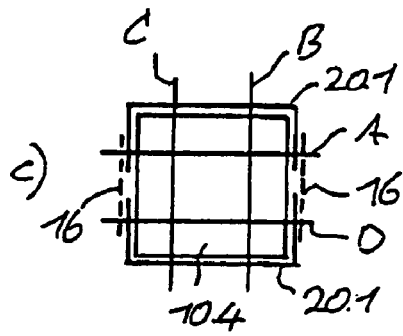

FIG. 10a shows schematically the arrangement of a U-shaped slide profile 20.1 on the upper side of the profiled bar 10.

FIG. 10b shows schematically the upper-side arrangement of a plurality of U-shaped slide profiles 20.1, 20.3, 20.4 which can be displaced longitudinally on one another.

FIG. 10c shows the arrangement of a U-shaped slide profile 20.1 on the upper side and underside of a square profiled bar 10.4, coupling of the two slide profiles 20.1 via coupling profiles 16 (illustrated dashed) arranged at the sides also being possible here.

Figure 11:
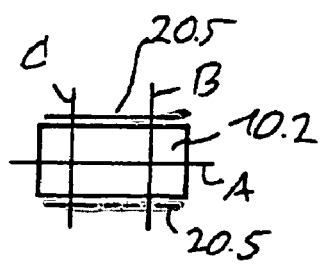
FIG. 11 shows a schematic illustration of the arrangement of a rectangular slide profile.

FIG. 11 shows, finally, a further embodiment of a slide profile 20.5, which is formed as a narrow rectangular profile and is arranged on the profiled bar 10 such that it can be displaced longitudinalally in the system axes B and C. The slide profile 20.5 can also additionally be present on the underside (dashed illustration).

The slide profiles described are preferably formed as extruded aluminum profiles. The sliding guide profiles are preferably produced from a slippery plastic.

FIGS. 13a to m illustrate the use of different slide profiles 20 . . . on different profiled bars 10 . . . the profiled bars corresponding to a known profiled bar system which is built up from the grid dimension/system dimension of 40 mm (millimeters) or a multiple thereof.

FIGS. 14a to i illustrate the use of different slide profiles 20 . . . on different profiled bars 10 . . . , the profiled bars corresponding to a known profiled bar system which is built up from the grid dimension/system dimension of 45 mm (millimeters) or a multiple thereof.

Figure 13:
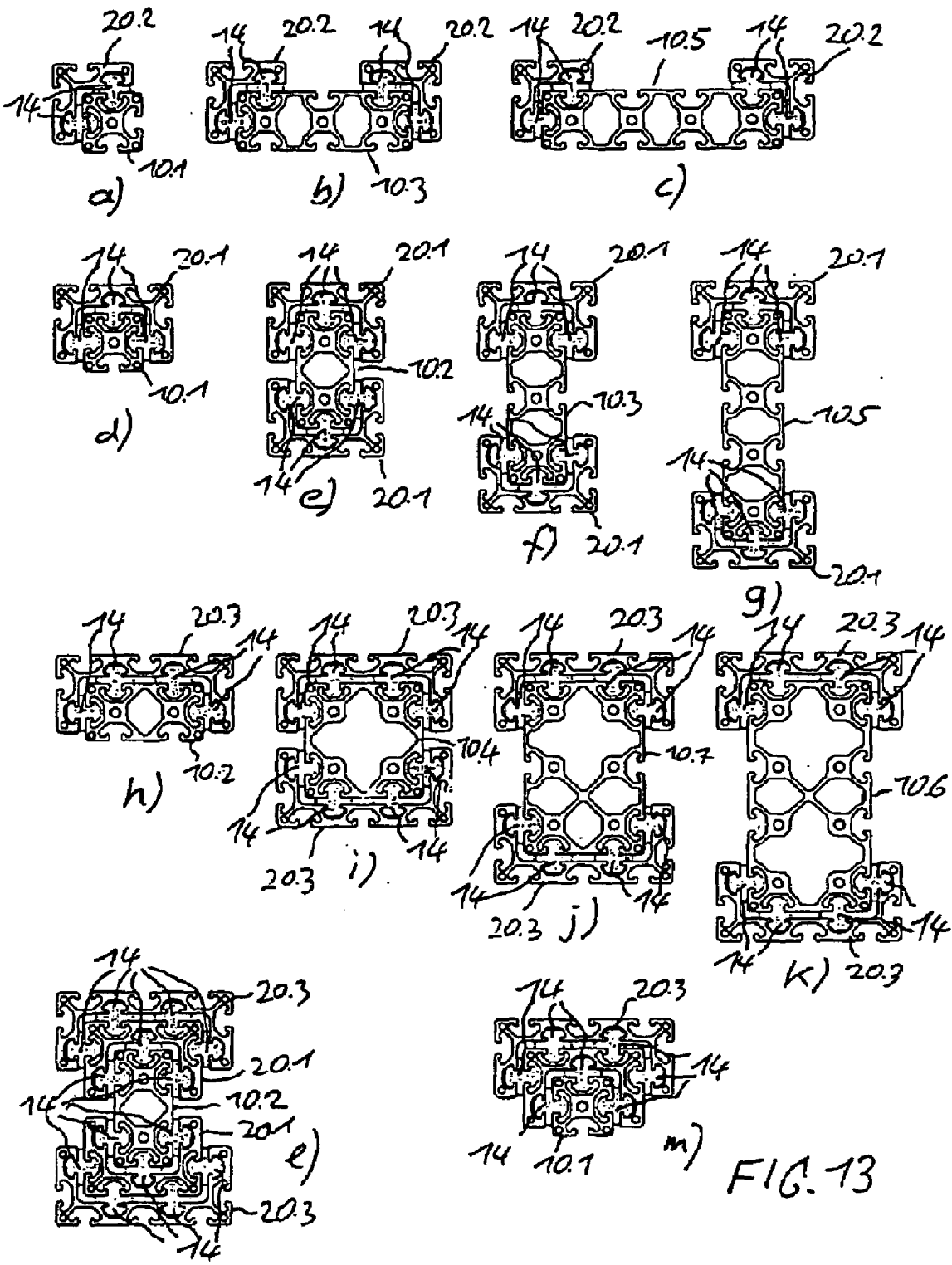
Figure 14:
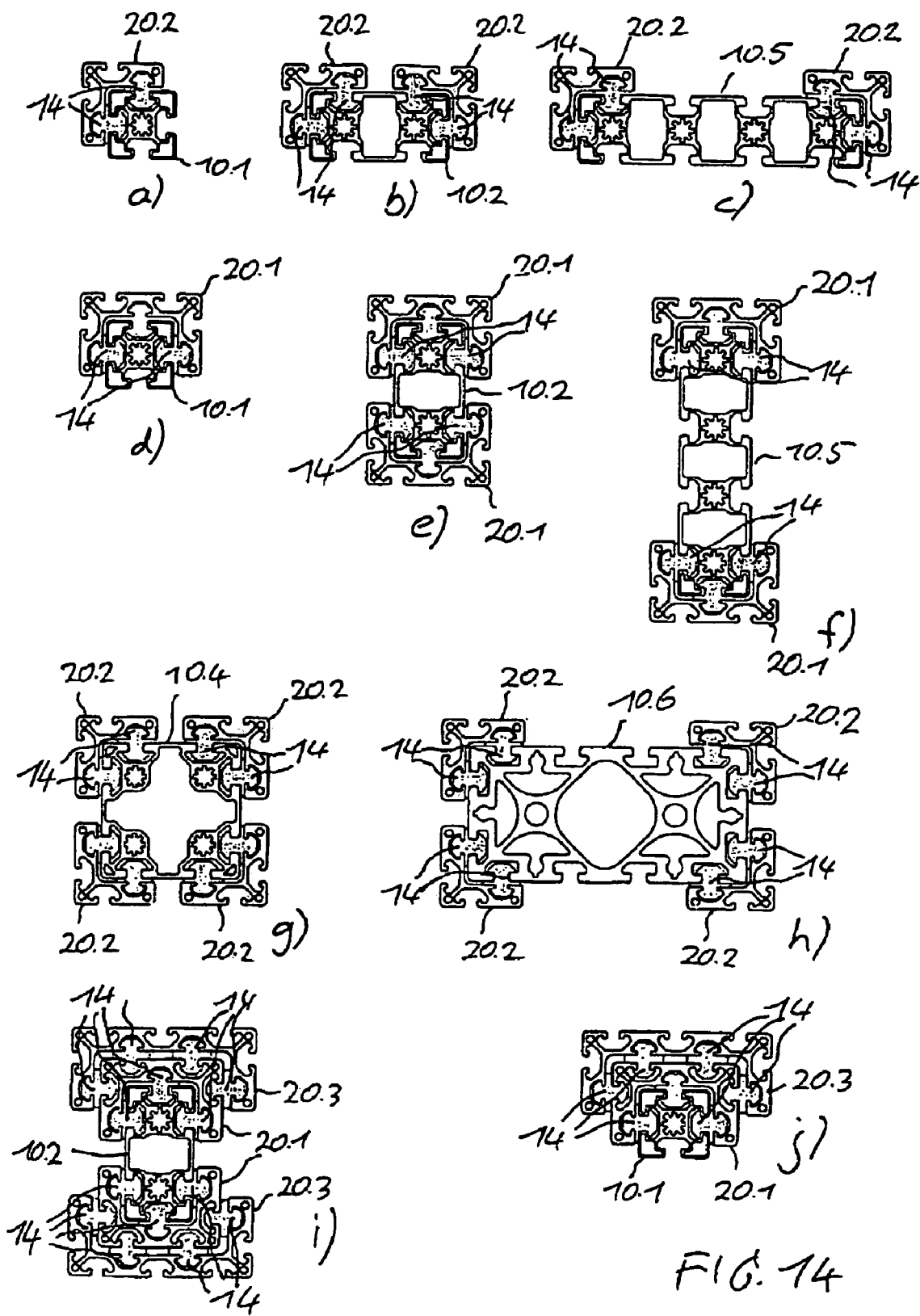
FIGS. 14a to 14i show a schematic sectional illustration of the connection of different slide profiles to different system profiled bars, the system profiled bars having a grid dimension of 45 mm (millimeters) or multiples thereof.

The same slide profiles 20 . . . are used in both system profiles 10 . . . according to FIG. 13 and FIG. 14. Compensating for the different basic system dimensions is effected by using different sliding guide profiles 14. This is illustrated in detail in FIGS. 15a and b. In the basic system with the grid dimension of 40 mm (millimeters), use is made of a sliding guide profile 14 whose protruding profile 36 has a height H1 (FIG. 15a). In the system illustrated in FIG. 15b, the grid dimension is 45 mm (millimeters) or a multiple thereof. The use of the same slide profiles 20.1 is possible because of the fact that the height H2 of the protruding profile 36 of the sliding guide profile is formed with an appropriate reduction.

Figure 16:
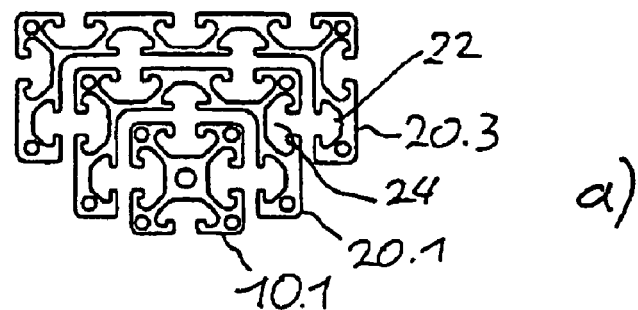
FIGS. 16a to 16c show a schematic sectional illustration of slide profiles which can be telescoped, arranged on different system profiled bars, the sliding guide profiles not being shown.
Figure 16:
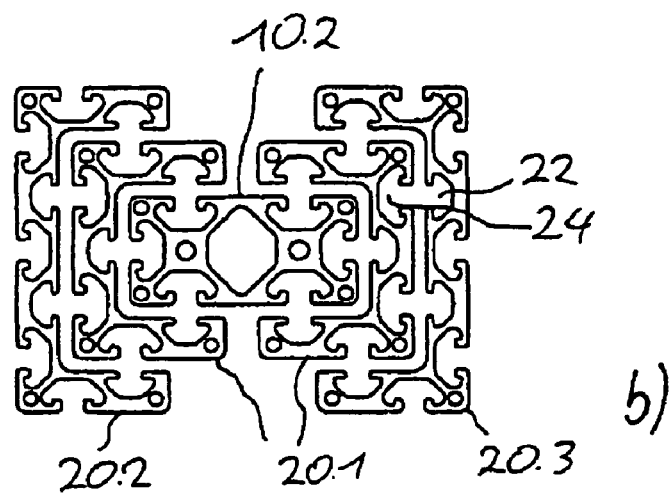
Figure 16:
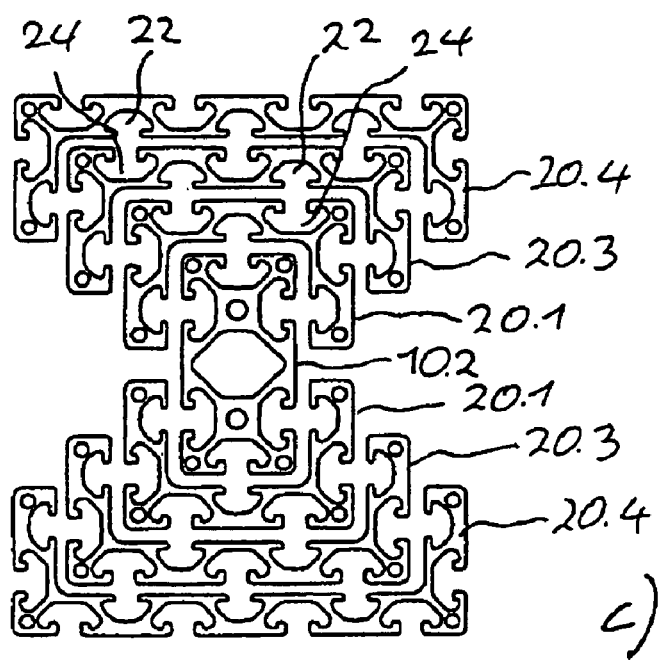

Three variants of slide profiles 20 . . . which can be telescoped are illustrated in FIGS. 16a, b and c. The ability to be telescoped is ensured by the fact that the internal longitudinal grooves 22 of one slide profile are arranged in accordance with the grid dimensions of the external longitudinal groove 24 of the slide profile located underneath. The sliding guide profiles 14 are not illustrated in FIGS. 16a to c.

The slide system described ensures high variability. The individual slide profiles have internal and external system grooves which are coordinated with the system grooves of the basic profiles. A combination of the slide profiles with profiled bars and a combination of slide profiles with one another can be implemented without difficulty. Furthermore, the slide system described ensures that different basic profiled bar systems can be used. The slide system described is suitable, for example, to be used in the known basic profiled bar system of the 40 series having 8-series grooves. The same slide profiles can also be used in the known basic system from the 45 series having 10-series grooves. For this purpose, it is merely necessary for a modified sliding guide profile to be used. The slide profiles themselves remain unchanged.

The invention claimed is:

1. A slide system comprising:
    at least one profiled slide having at least one internal longitudinal groove on the inner side of the profiled slide and at least one external longitudinal groove on the outer side of the profiled slide, wherein when the profiled slide is connected to a profiled bar having at least one longitudinal groove, the profiled slide can be displaced with respect to the profiled bar in the profiled slide longitudinal direction; and
    at least one profiled sliding guide which engages the at least one longitudinal groove of the profiled bar and the at least one internal longitudinal groove of the profiled slide,
    wherein the at least one profiled slide is formed in a U-shape and has at least one internal longitudinal groove and at least one external longitudinal groove on each its legs, and
    wherein the width and the height of the at least one external longitudinal groove of the at least one profiled slide corresponds to the width and the height of the at least one longitudinal groove of the profiled bar.

2. The slide system as claimed in claim 1, wherein the width and the height of the at least one internal longitudinal groove of the profiled slide is less than the width and the height; of the at least one longitudinal groove of the profiled bar.

3. The slide system as claimed in claim 1 or 2, wherein the dimensions of internal longitudinal grooves correspond to the dimensions of adjacent external longitudinal grooves.

4. The slide system as claimed in claim 1 or 2, wherein at least one further profiled slide is arranged such that it can be displaced longitudinally on the upper side and/or underside of the profiled slide.

5. The slide system as claimed in claim 1 or 2, wherein the profiled sliding guide has in each of its upper and lower cross-sectional areas, a grooved block contour which engages the at least one longitudinal groove of the profiled bar or the at least one internal or external longitudinal groove of the at least one profiled slide.

6. The slide system as claimed in claim 5, wherein a protrusion having a rectangular cross section is located between the upper and lower cross-sectional areas of the profiled sliding guide.

7. The slide system as claimed in claim 1 or 2, wherein the profiled bar is formed as substantially rectangular-shaped or square-shaped.

8. The slide system as claimed in claim 1 or 2, wherein the profiled bar is formed as substantially rectangular-shaped or square-shaped, and the at least one U-shaped profiled slide is arranged such that it can be displaced longitudinally on the upper side and/or lower side of the profiled bar.

9. The slide system as claimed in claim 1 or 2, further comprising a profiled coupling which couples adjacent profiled slides to one another and can be displaced longitudinally on the profiled bar.

10. The slide system as claimed in claim 1 or 2, wherein the profiled slide is formed as an extruded metal profiled portion.

11. The slide system as claimed in claim 1 or 2, characterized in that
the sliding guide profile (14) is formed of plastic.

12. The slide system as claimed in claim 1 or 2, characterized in that
a combination of L-shaped and/or U-shaped and/or rectangular slide profiles is arranged on the profiled bar (10).

13. The slide system as claimed in claim 1 or 2, characterized in that
the contour, that is to say the width and height, of the internal longitudinal groove of the slide profile corresponds to the contour of the longitudinal groove of the profiled bar.

* * * * *